United States Patent
Shiraki

(10) Patent No.: US 11,762,610 B2
(45) Date of Patent: Sep. 19, 2023

(54) COMMUNICATION APPARATUS THAT PERFORMS A PROCESS IN RESPONSE TO A JOB NOTIFICATION RECEIVED FROM A SERVER AND NON-TRANSITORY COMPUTER-READABLE MEDIUM FOR COMMUNICATION APPARATUS

(71) Applicant: BROTHER KOGYO KABUSHIKI KAISHA, Nagoya (JP)

(72) Inventor: Tomomi Shiraki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/700,601

(22) Filed: Mar. 22, 2022

(65) Prior Publication Data
US 2022/0317950 A1 Oct. 6, 2022

(30) Foreign Application Priority Data
Mar. 31, 2021 (JP) ................. 2021-060185

(51) Int. Cl.
*G06F 3/12* (2006.01)

(52) U.S. Cl.
CPC .......... *G06F 3/1236* (2013.01); *G06F 3/1203* (2013.01); *G06F 3/1267* (2013.01); *G06F 3/1292* (2013.01)

(58) Field of Classification Search
CPC .... G06F 3/1236; G06F 3/1203; G06F 3/1267; G06F 3/1292
USPC ...................................................... 358/1.15
See application file for complete search history.

(56) References Cited

U.S. PATENT DOCUMENTS

| | | | |
|---|---|---|---|
| 5,720,014 A * | 2/1998 | Ikeda | H04N 1/00915 358/437 |
| 2012/0229844 A1 | 9/2012 | Yada et al. | |
| 2016/0080591 A1* | 3/2016 | Asakura | H04W 4/80 358/1.15 |
| 2019/0042167 A1* | 2/2019 | Yamada | G06F 3/1207 |
| 2021/0294550 A1* | 9/2021 | Sako | G06F 3/1259 |
| 2022/0206732 A1* | 6/2022 | Yamamoto | G06F 3/126 |

FOREIGN PATENT DOCUMENTS

JP  2012187866 A  10/2012

* cited by examiner

*Primary Examiner* — Allen H Nguyen
(74) *Attorney, Agent, or Firm* — Scully, Scott, Murphy & Presser, PC

(57) ABSTRACT

A communication apparatus can perform an appropriate process in response to a job notification received from a server. The communication apparatus sets an operation mode to a first mode. The first mode is a mode to receive a job notification from a server using a connection established for server-push communication between the communication apparatus and the server. The job notification indicates whether a job to be performed by the communication apparatus is occurring. The communication apparatus disconnects the connection before completion of a first job in response to a first job notification being received from the server using the connection during the first mode. The first job notification indicates occurrence of the first job to be performed by the communication apparatus. The communication apparatus performs the first job in response to the first job notification being received from the server.

17 Claims, 12 Drawing Sheets

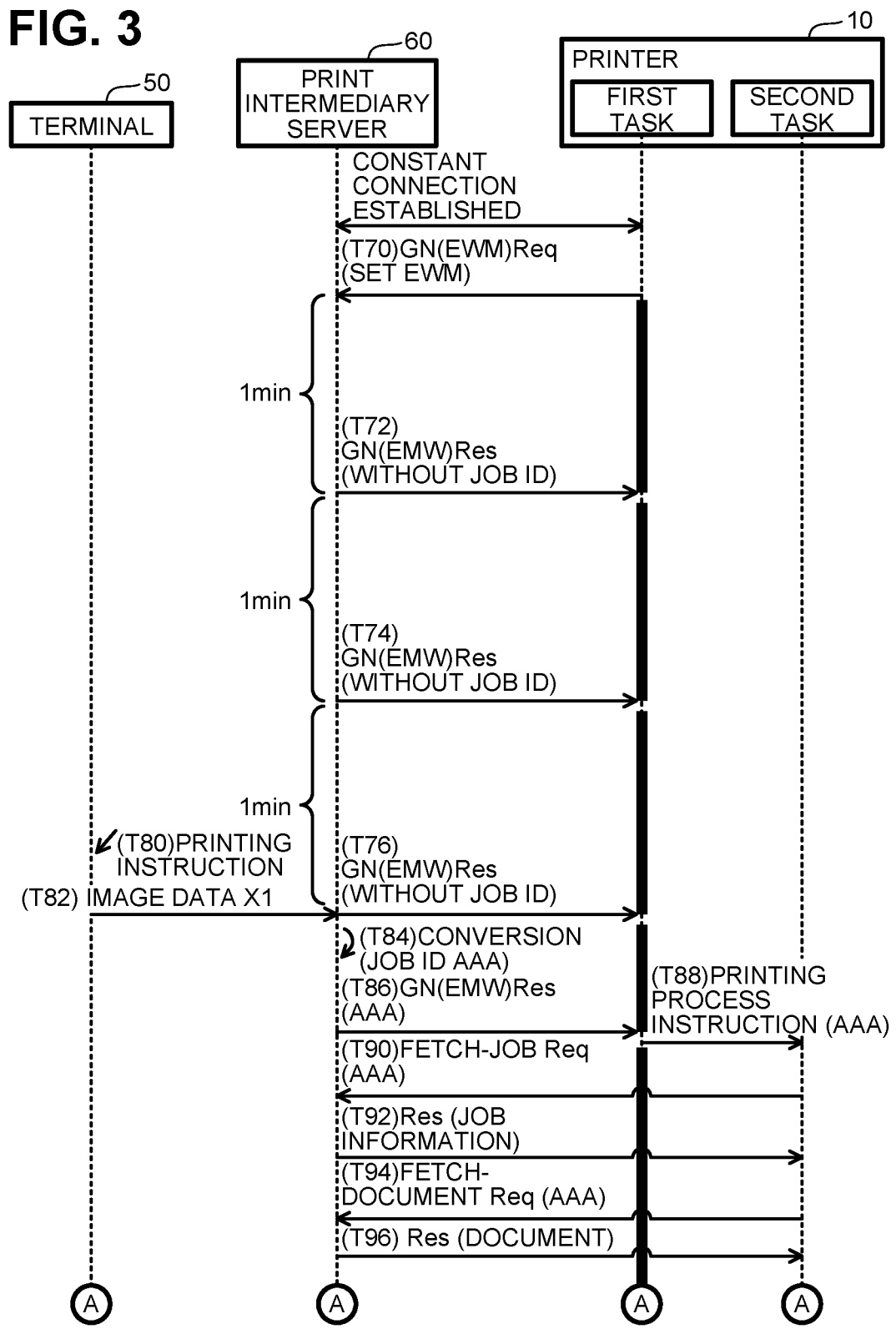

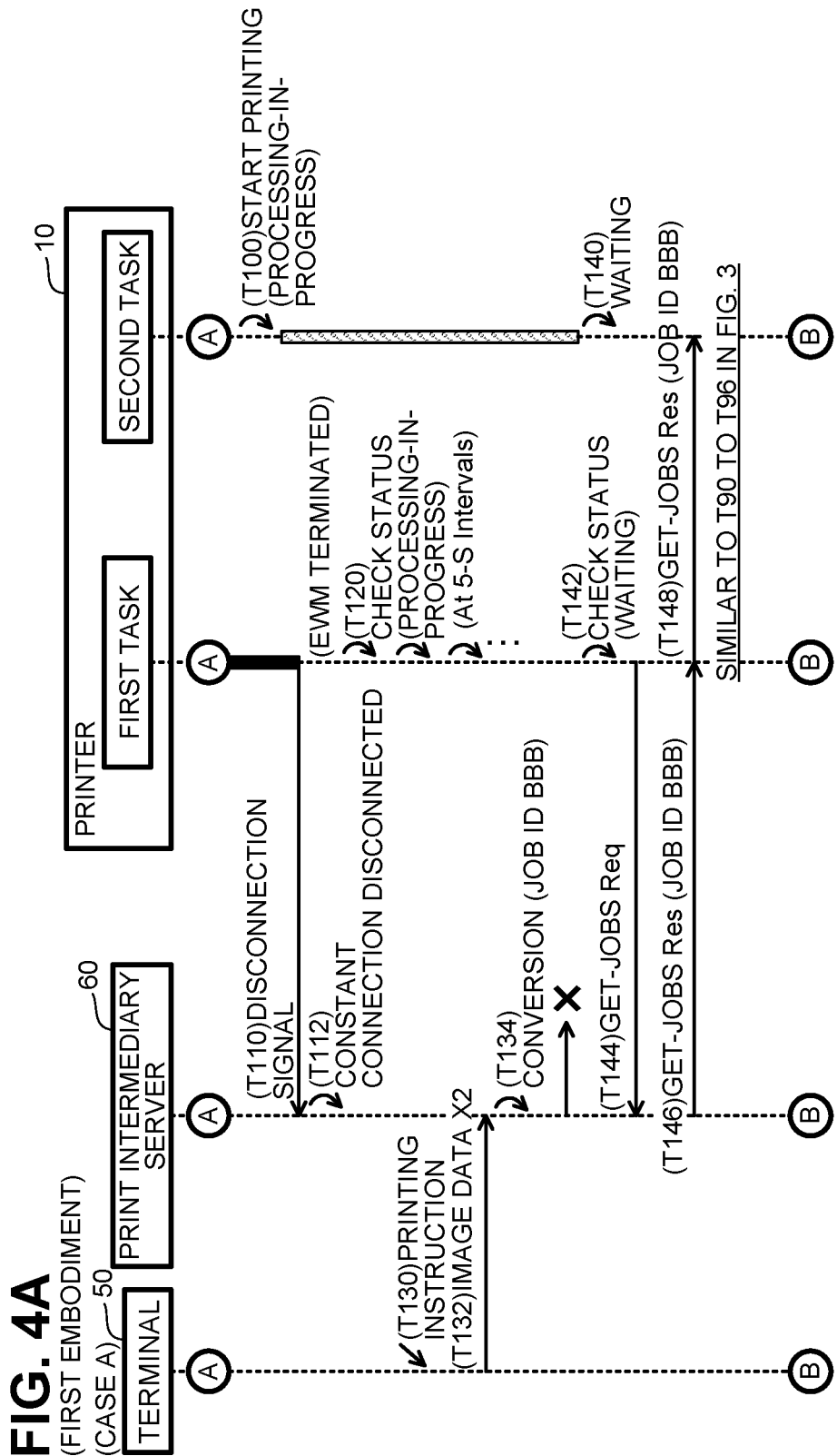

(FIRST EMBODIMENT)
(CASE B)

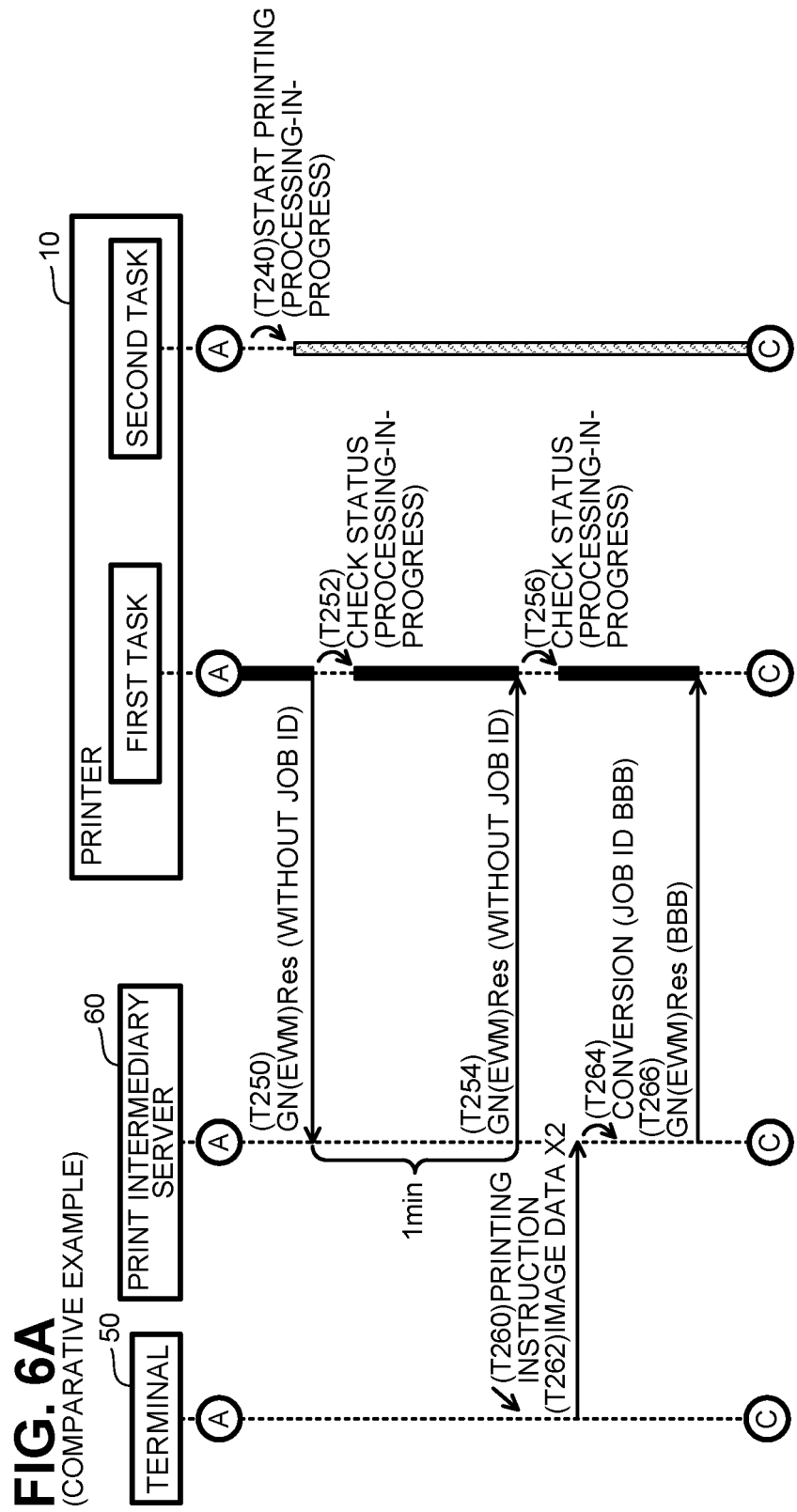

FIG. 7A
(SECOND EMBODIMENT)
(CASE A)

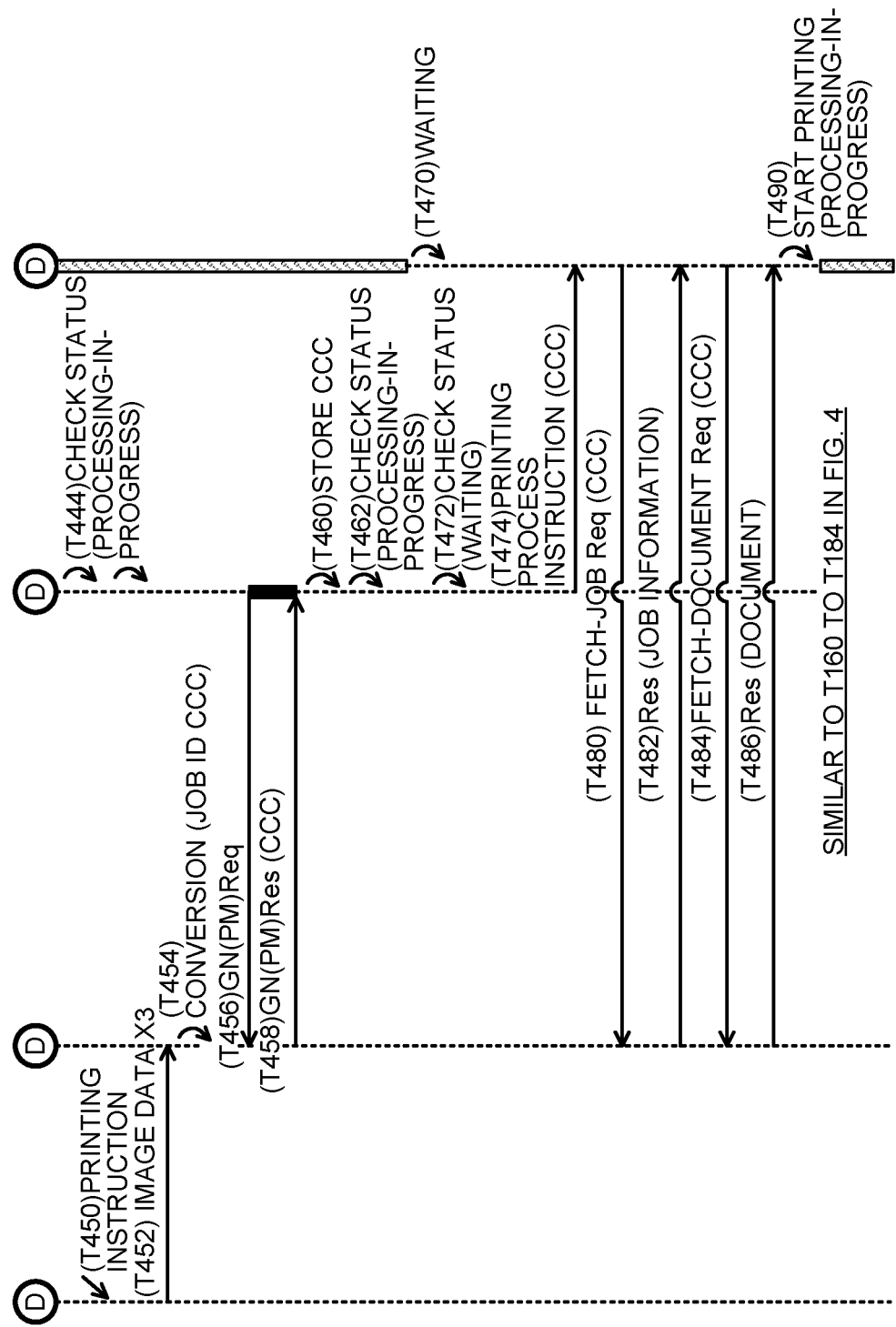

(SECOND EMBODIMENT)
(CASE B)

COMMUNICATION APPARATUS THAT PERFORMS A PROCESS IN RESPONSE TO A JOB NOTIFICATION RECEIVED FROM A SERVER AND NON-TRANSITORY COMPUTER-READABLE MEDIUM FOR COMMUNICATION APPARATUS

CROSS-REFERENCE TO RELATED APPLICATION

This application claims priority from Japanese Patent Application No. 2021-060185 filed on Mar. 31, 2021, the content of which is incorporated herein by reference in its entirety.

TECHNICAL FIELD

The present disclosure relates to a technique for a communication apparatus that performs a job in response to a job notification received from a server.

BACKGROUND

A known printer can perform printing in accordance with Google Cloud Print (GCP). The printer may establish an eXtensible Messaging and Presence Protocol (XMPP) connection with a print intermediary server (hereafter, an XMPP mode). The printer in this mode receives a notification about printing from the print intermediary server immediately after a print job is generated by the print intermediary server. Upon having unstable communication with the print intermediary server, the printer operating in the XMPP mode closes the XMPP stream and switches to a state of periodically transmitting a polling signal to the print intermediary server. The print intermediary server may have a print job when a polling signal is transmitted. In this case, the printer receives a notification about printing from the print intermediary server.

SUMMARY

A communication apparatus described herein can perform an appropriate process in response to a job notification received from a server.

A communication apparatus according to an aspect of the disclosure may include a controller. The controller is configured to: set an operation mode of the communication apparatus to a first mode, the first mode being a mode to receive a job notification from a server using a connection established for server-push communication between the communication apparatus and the server, the job notification indicating whether a job to be performed by the communication apparatus is occurring; disconnect the connection before completion of a first job in response to a first job notification being received from the server using the connection during the operation mode of the communication apparatus being the first mode, the first job notification indicating occurrence of the first job to be performed by the communication apparatus; and perform the first job in response to the first job notification being received from the server.

In response to the first job notification received from the server, the communication apparatus with the above structure disconnects the connection with the server before completion of the first job. The communication apparatus can avoid performing a process for maintaining the connection with the server while performing the first job. This saves resources for performing the process.

A communication apparatus according to an aspect of the disclosure may include a controller. The controller is configured to: set an operation mode of the communication apparatus to a first mode, the first mode being a mode to receive a job notification from a server using a connection established for server-push communication between the communication apparatus and the server, the job notification indicating whether a job to be performed by the communication apparatus is occurring, the first mode being a mode in which the communication apparatus operates to perform a first task to receive, in response to occurrence of a job to be performed by the communication apparatus, a job occurrence notification as the job notification, and receive, in response to non-occurrence of a job to be performed by the communication apparatus, a job non-occurrence notification as the job notification at intervals of a first predetermined time, the job occurrence notification indicating that a job to be performed by the communication apparatus is occurring, the job non-occurrence notification indicating that a job to be performed by the communication apparatus is not occurring, the operation mode being switched to a blocked state in which another process is not performed in a period from when a process of receiving the job non-occurrence notification is performed to when a process of receiving a subsequent job non-occurrence notification is performed; terminate the first mode in response to a first job occurrence notification received, using the first task, from the server using the connection during the operation mode of the communication apparatus being the first mode, the first job occurrence notification indicating occurrence of a first job to be performed by the communication apparatus; and perform the first job using a second task different from the first task in response to the first job occurrence notification being received from the server.

The communication apparatus with the above structure terminates the first mode in response to the first job occurrence notification received from the server. The first task can thus perform another process without switching to the blocked state at intervals of the first predetermined time.

A computer program for implementing the communication apparatus, and a computer-readable recording medium storing the computer program are also novel and useful. A method implementable by the communication apparatus is also novel and useful. A communication system including the communication apparatus and another device (e.g., a server) is also novel and useful.

BRIEF DESCRIPTION OF THE DRAWINGS

FIG. 3 is a sequence diagram showing a printing process.
FIG. 4A is a sequence diagram showing processing continuous from FIG. 3 in case A.
FIG. 6A is a sequence diagram in a comparative example.
FIG. 7A is a sequence diagram in case A in a second embodiment.
FIG. 7B is a sequence diagram in case A in the second embodiment showing processing continuous from FIG. 7A.

DETAILED DESCRIPTION

Figure 1:
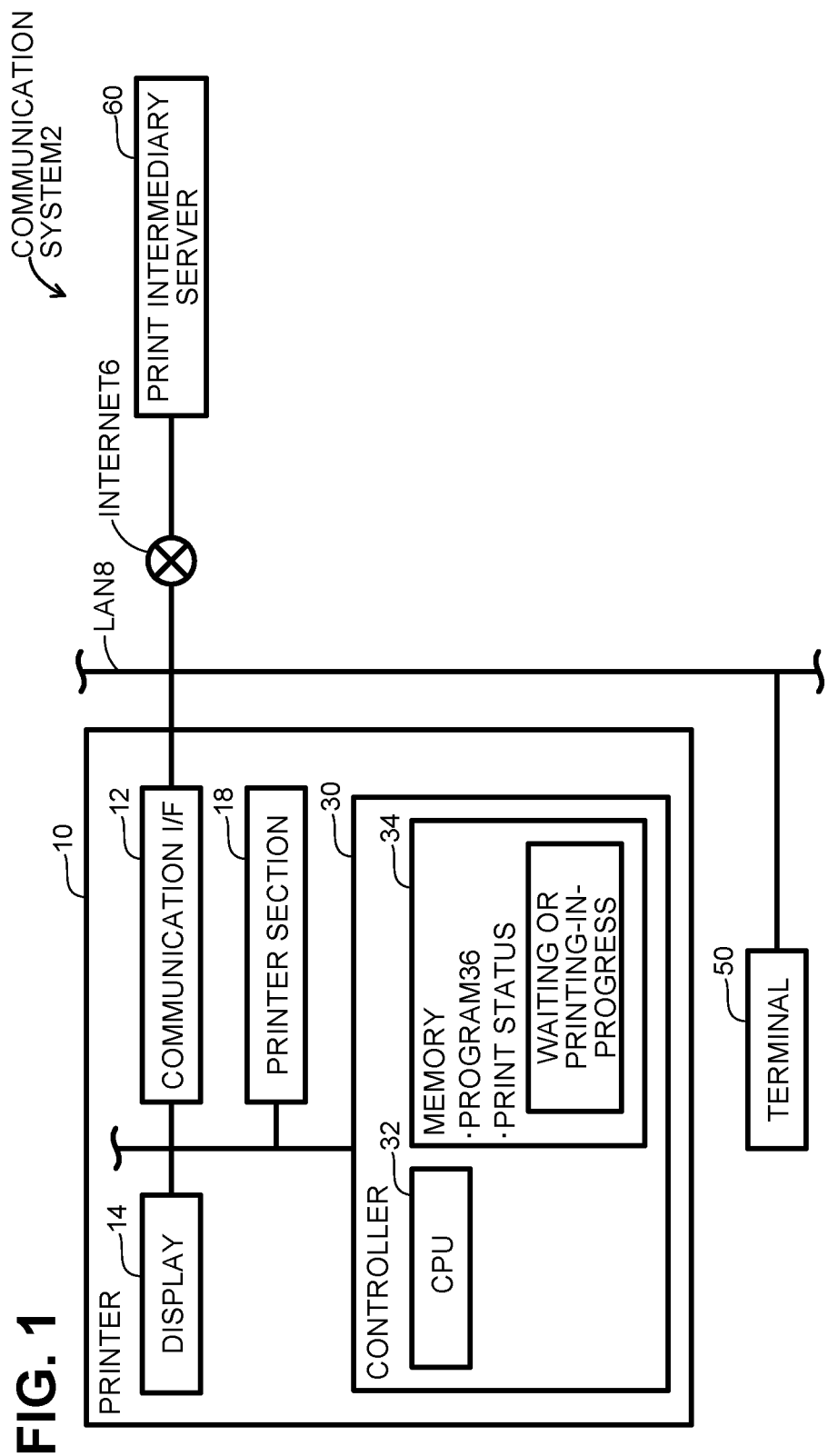
FIG. 1 is a block diagram of a communication system.

First Embodiment (Structure of Communication System 2: FIG. 1)

As shown in FIG. 1, a communication system 2 includes a printer 10, a terminal 50, and a print intermediary server 60. The printer 10 and the terminal 50 are connected to a local area network (LAN) 8. The printer 10 and the terminal 50 can communicate with each other through the LAN 8. The LAN 8 may be a wired or wireless LAN. The LAN 8 is connected to the Internet 6. The Internet 6 is connected to the print intermediary server 60. The printer 10, the terminal 50, and the print intermediary server 60 can communicate with one another through the Internet 6.

(Structure of Printer 10)

The printer 10 is a peripheral (e.g., a peripheral for the terminal 50) that can perform printing. The printer 10 may be a multifunctional printer that can perform scanning and faxing in addition to printing. The printer 10 includes a communication interface (hereafter, I/F) 12, a display 14, a printer section 18, and a controller 30.

The communication I/F 12 is connected to the LAN 8. The communication I/F 12 may be a wireless or wired I/F. The display 14 is a touchscreen and also functions as an operable section. The printer section 18 performs printing such as inkjet printing or laser printing.

The controller 30 incudes a central processing unit (CPU) 32 and a memory 34. The CPU 32 performs various processes in accordance with a program 36 stored in the memory 34. The memory 34 includes, for example, a volatile memory and a nonvolatile memory. The memory 34 further stores a print status. The print status is one of multiple statuses including processing-in-progress and waiting. The processing-in-progress status indicates that the printer 10 is performing a print job. The waiting status indicates that the printer 10 is not performing a print job.

(Structure of Print Intermediary Server 60)

The print intermediary server 60 provides a cloud printing service. In the present embodiment, the print intermediary server 60 is not installed by the vendor of the printer 10 but is installed by the provider of the cloud printing service. In a modification, the print intermediary server 60 may be installed by the vendor of the printer 10. For example, the print intermediary server 60 receives image data from the terminal 50, generates a job, and transmits the job to the printer 10. The job includes print data resulting from image data converted into a format interpretable by the printer 10. The print intermediary server 60 is hereafter simply referred to as a server 60.

Figure 2:
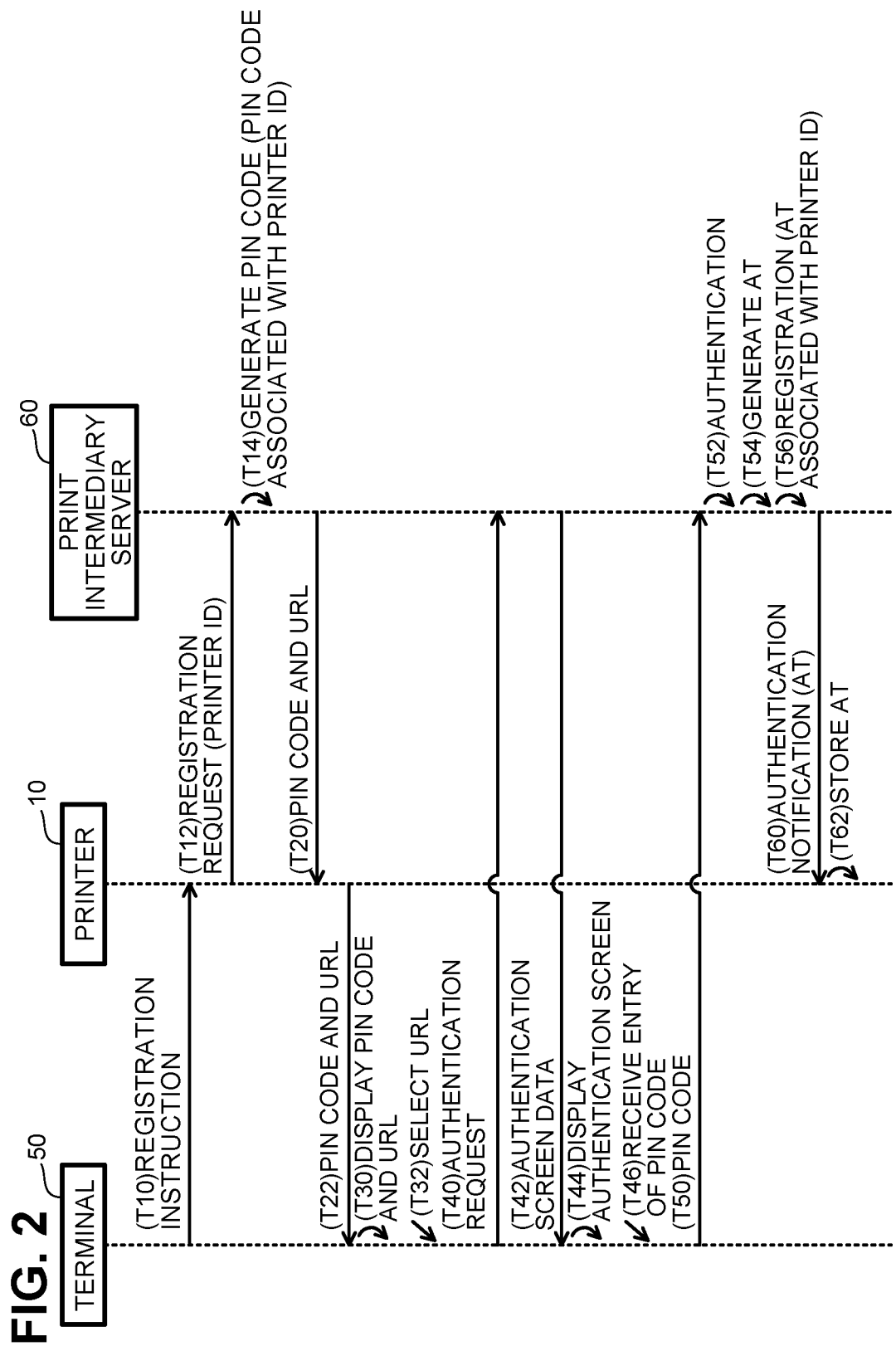
FIG. 2 is a sequence diagram showing a registration process.

(Registration Process: FIG. 2)

A registration process for registering information about the printer 10 with the server 60 will now be described with reference to FIG. 2. The printer 10 registered with the server 60 can receive a cloud printing service from the server 60. A process performed by the CPU 32 in the printer 10 in accordance with the program 36 is hereafter referred to as a process performed by the printer 10 for ease of understanding. The printer 10 performs all the communication through the communication I/F 12 although hereafter not being specified as being through the communication I/F 12.

In response to an operation performed by a user, the terminal 50 accesses a web server in the printer 10. Further in response to an operation performed by the user for receiving the cloud printing service, the terminal 50 transmits a registration instruction to the printer 10 in T10.

In response to the registration instruction received from the terminal 50 in T10, the printer 10 transmits a registration request including a printer identification (ID) for identifying the printer 10 to the server 60 in T12.

In response to the registration request received from the printer 10 in T12, the server 60 generates a personal identification number (PIN) code and stores the generated PIN code in a manner associated with the printer ID included in the registration request in T14. The server 60 then transmits the PIN code and a uniform resource locator (URL) for a login to the printer 10 in T20. The URL for a login indicates the location of authentication screen data (described later) in the server 60.

In response to the PIN code and the URL received from the server 60 in T20, the printer 10 transmits these to the terminal 50 in T22.

In response to the PIN code and the URL received from the printer 10 in T22, the terminal 50 displays these in T30. In response to an operation performed by the user for selecting the URL in T32, the terminal 50 transmits an authentication request including the URL to the server 60 in T40.

In response to the authentication request received from the terminal 50 in T40, the server 60 transmits authentication screen data identifiable with the URL included in the authentication request to the terminal 50 in T42. The authentication screen data represents an authentication screen for receiving an entry of the PIN code.

In response to the authentication screen data received from the server 60 in T42, the terminal 50 displays an authentication screen represented by the authentication screen data in T44. The terminal 50 receives an entry of the PIN code displayed in T30 from the user in T46. In T50, the terminal 50 transmits the entered PIN code to the server 60.

In response to the PIN code received from the terminal 50 in T50, the server 60 authenticates the received PIN code in T52. More specifically, the server 60 determines whether the received PIN code has been stored. In response to a determination that the received PIN code has been stored, or in other words, in response to a successful authentication, the server 60 generates an access token (AT) as a unique character string in T54. The server 60 then stores the generated AT in a manner associated with the printer ID in T56 and transmits an authentication notification including the generated AT to the printer 10 in T60.

In response to the authentication notification in T62, the printer 10 stores the AT included in the authentication notification into the memory 34. This completes the registration process.

Figure 4B:
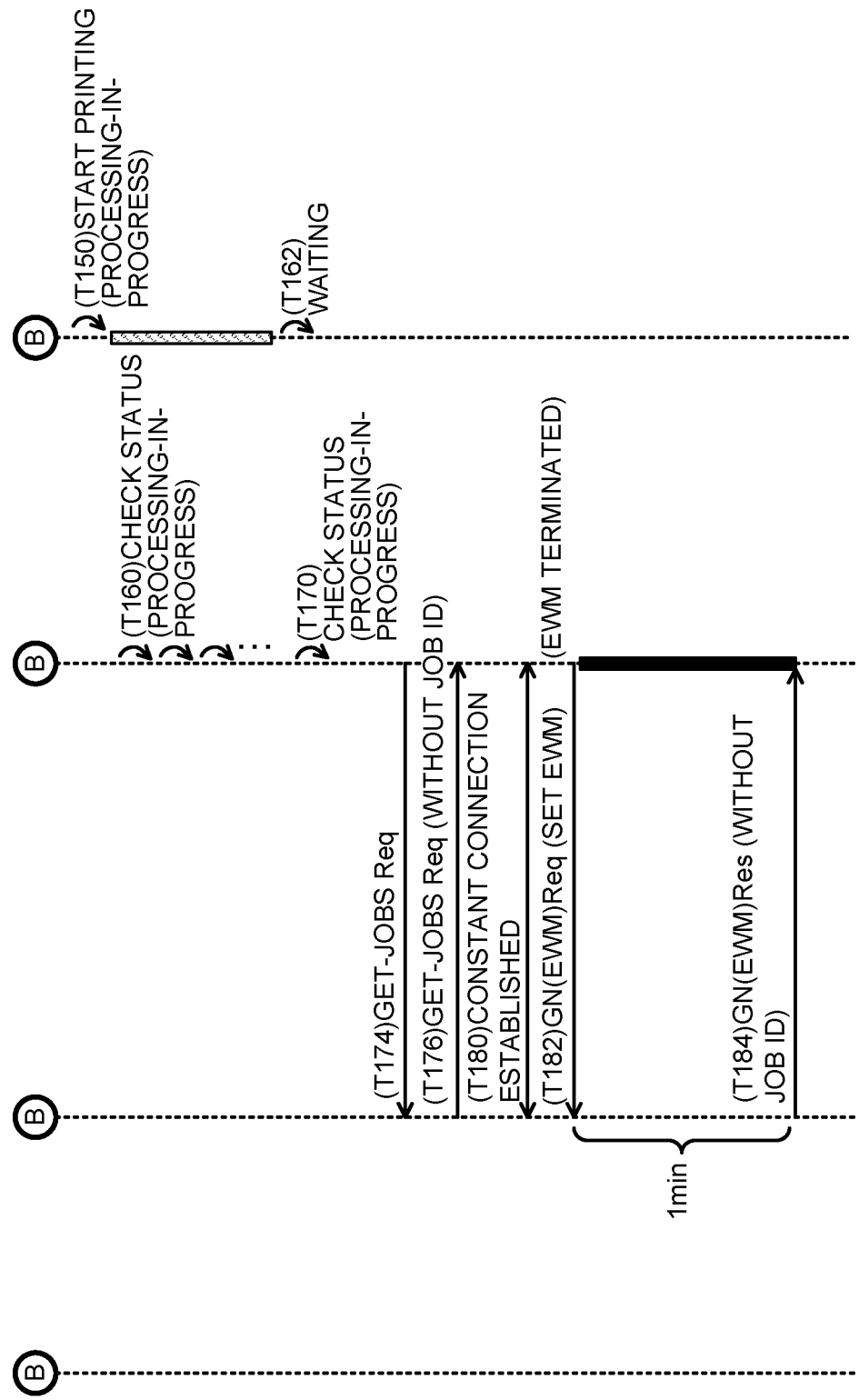
FIG. 4B is a sequence diagram showing processing continuous from FIG. 4A.
Figure 5:
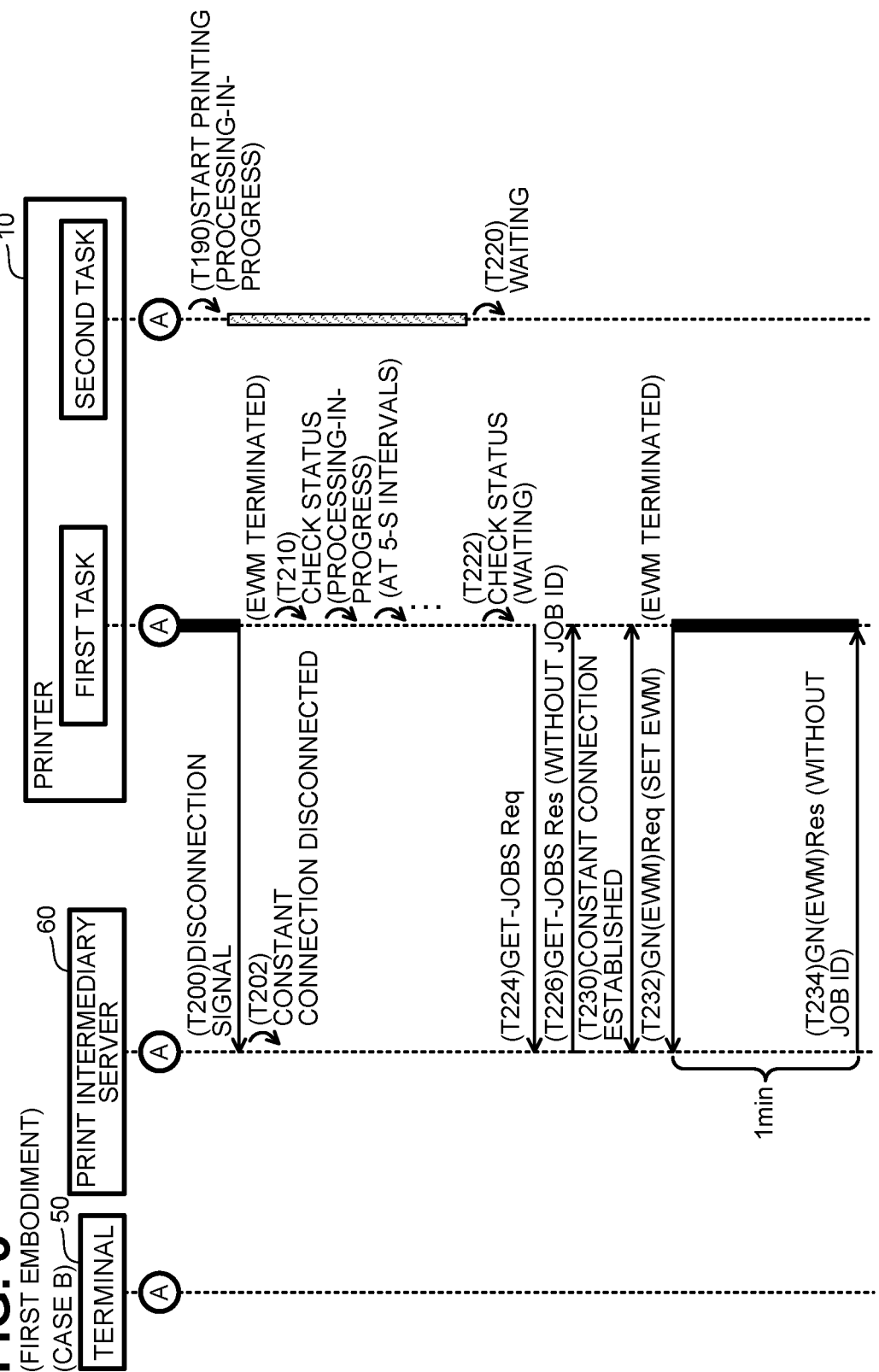
FIG. 5 is a sequence diagram showing processing continuous from FIG. 3 in case B.

(Printing Process: FIGS. 3 to 5)

The printing process in the present embodiment will now be described with reference to FIGS. 3 to 5. In case A described now with reference to FIGS. 3, 4A and 4B, a new job is generated in a printing process being performed by the printer 10 with the constant connection being disconnected. In case B then described with reference to FIG. 5, no new job is generated in a printing process being performed by the printer 10 with the constant connection being disconnected.

The CPU 32 in the printer 10 can perform multiple tasks in parallel. A process performed by the CPU 32 using the first task or the second task is hereafter referred to as a process performed by the first task or the second task. The first task mainly includes receiving a notification as to whether a job is occurring from the server 60. The second task mainly includes receiving a job from the server 60 in response to a printing process instruction obtained from the first task and causing the printer section 18 to perform printing in accordance with the job.

(Case A: FIG. 3)

In FIG. 3, the printer 10 establishes a constant connection with the server 60 at default using the stored AT (refer to T62 in FIG. 2). The constant connection allows the server 60 to perform server-push communication with the printer 10 beyond the firewall of the LAN 8 including the printer 10. In the present embodiment, the printer 10 establishes a constant connection in accordance with the Hypertext Transfer Protocol (HTTP). In a modification, the printer 10 may establish a constant connection in accordance with the eXtensible Messaging and Presence Protocol (XMPP).

The first task performs communication with the server 60 in a blocked mode. More specifically, the first task cannot perform any process during a period from transmission of a request to reception of a response. This state is hereafter referred to as a blocked state. The first task being in the blocked state allows the CPU 32 in the printer 10 to promptly perform another process. In response to a response to the request, the first task ends the blocked state and resumes the process. In FIG. 3 and subsequent figures, thick solid lines each indicate a period during which the first task is in the blocked state, and thin dashed lines each indicate a period during which the first task is not in the blocked state.

The first task performs transmission of a get-notification (event wait mode) request (hereafter, a GN(EWM)Req) to the server 60 in T70. In response to transmission of a GN(EWM)Req, the first task switches to the blocked state. The GN(EWM)Req is a signal for requesting, in response to occurrence of a job to be performed by the printer 10, the server 60 to transmit a notification about the job occurrence (or a response to the GN(EWM)Req) to the printer 10. This signal causes the printer 10 to operate in an event wait mode (hereafter, an EWM). In the EWM, the printer 10 and the server 60 are to have a constant connection between them to perform server-push communication (or more specifically, communication of the above notification).

A mode available other than the EWM is a polling mode (hereafter, a PM). In the PM, the printer 10 periodically transmits a get-notification (polling mode) request (hereafter, a GN(PM)Req) to the server 60, and receives, in response to occurrence of a job to be performed by the printer 10, a notification about the job occurrence (or a response to the GN(PM)Req) from the server 60. In the PM with no server-push communication being performed, the printer 10 and the server 60 are not to have a constant connection between them. In the EWM, the printer 10 can immediately receive a notification from the server 60 in response to occurrence of a job to be performed by the printer 10. The printer 10 can thus perform a job more promptly in the EWM than in the PM.

In response to a GN(EMW)Req received from the first task in T70, the server 60 periodically transmits a get-notification (event wait mode) response (hereafter, a GN(EMW)Res) to the printer 10 using the constant connection in T72 to T76 and T86. In the present embodiment, the server 60 transmits a GN(EMW)Res including no job ID to the printer 10 at intervals of one minute in a period before the server 60 receives image data representing the image to be printed by the printer 10 (refer to T72 to T76). In response to image data representing the image to be printed by the printer 10 (or in other words, in response to occurrence of a job to be performed by the printer 10) received from the terminal 50, the server 60 transmits a GN(EMW)Res including a job ID to the printer 10 (refer to T86).

In response to a GN(EMW)Res including no job ID received from the server 60 in T72, the first task ends the blocked state. The first task performs a process associated with the reception of the Res (e.g., a process of checking information in the Res or discarding the Res) and then returns to the blocked state. For every reception of a GN(EMW)Res including no job ID from the server 60 in T74 and T76, the first task performs a process of ending the blocked state and then returns to the blocked state in the same manner as in T72. In other words, the first task repeatedly operates in the blocked state for one minute being the interval of reception of a GN(EMW)Res including no job ID from the server 60. In a modification, the interval may be longer or shorter than one minute.

In T80, the user performs an operation on the terminal 50 to cause printing. The operation includes an indication of the printer to be used for printing (the printer 10 in the present embodiment) and an indication of an image to be printed. In T82, the terminal 50 transmits, to the server 60, the printer ID (not shown) identifying the printer 10 indicated by the user and image data X1 representing the image to be printed.

In response to the printer ID and the image data X1 received from the terminal 50 in T82, the server 60 generates a job identifiable with the job ID AAA in T84. More specifically, the server 60 first converts the image data X1 received from the terminal 50 to generate print data (or a document described below) in a format interpretable by the printer 10. The server 60 stores the printer ID, the job ID AAA, and the print data in a manner associated with one another. The server 60 then transmits a GN(EMW)Res including the job ID AAA to the printer 10 in T86.

In response to the GN(EMW)Res including the job ID AAA received from the server 60 in T86, the first task ends the blocked state. The first task then provides a printing process instruction including the received job ID AAA to the second task in T88. The first task then returns to the blocked state.

In response to the printing process instruction including the job ID AAA from the first task in T88, the second task performs transmission of a fetch job request to the server 60 in T90 and receives a response including job information from the server 60 in T92. The job information includes setting information indicating print settings such as the number of colors used for printing, the size of a printing sheet, and the number of sheets to be printed. The second task then performs transmission of a fetch-document request to the server 60 in T94 and receives a response including print data X1 (or a document) from the server 60 in T96.

(Processing Continuous from FIG. 3: FIGS. 4A and 4B (Case A))

As shown in FIG. 4A, the second task provides the print data X1 to the printer section 18 in T100. This causes the printer section 18 to start printing the image represented by the print data X1. The second task further changes the print status in the memory 34 from waiting to processing-in-progress in T100. In FIG. 4A and subsequent figures, thick hatched lines each indicate the second task with the print data provided to the printer section 18, or in other words, with the print status being processing-in-progress.

Once providing the printing process instruction to the second task in T88 in FIG. 3, the first task performs transmission of a disconnection signal to the server 60 in T110 for requesting a disconnection of the constant connection. This causes the server 60 to disconnect the constant connection in T112. The printer 10 then terminates the operation in the EWM. The printer 10 thus operates neither in the EWM nor in the PM.

As described above, the printer 10 disconnects the constant connection with the server 60, and thus avoids performing a process of maintaining the constant connection with the server 60 while performing the job corresponding to the job ID AAA (or in other words, between T112 and T140 described later). The process of maintaining the constant connection includes, for example, at least one of periodically transmitting a signal for maintaining the constant connection to the server 60 or periodically receiving a signal for maintaining the constant connection from the server 60. This reduces the processing load on the CPU 32 and also reduces the communication load on the communication I/F 12. The printer 10 can also free the space in the memory 34 to be used for maintaining the constant connection. This saves the space to be used in the memory 34.

The printer 10 terminating the EWM allows the first task to avoid repeatedly operating in the blocked state for substantially one minute. The first task can thus perform another process. More specifically, the first task can perform a process of checking the print status in T120. In other words, the first task can perform a process of monitoring completion of the job by checking the print status in the memory 34. At the stage of T120, the first task determines that the job is not complete based on the print status being processing-in-progress. The first task performs a process of checking the print status and then sleeps for five seconds. After a five-second sleep, the first task ends the sleep and checks the print status again. The first task then sleeps for five seconds again. In other words, the first task repeatedly performs a process of checking the print status and sleeps at intervals of five seconds. In a modification, the interval may be longer or shorter than five seconds.

In T130 and T132, the terminal 50 performs processing similar to the processing in T80 and T82 in FIG. 3. In T132, the terminal 50 transmits, to the server 60, the printer ID identifying the printer 10 and image data X2 representing the image to be printed.

In response to the printer ID and the image data X2 received from the terminal 50 in T132, the server 60 generates a job identifiable with the job ID BBB in T134. In this case, the constant connection between the server 60 and the printer 10 has already been disconnected (refer to T112). The server 60 thus cannot transmit a GN(EMW)Res including the job ID BBB to the printer 10.

Upon completion of the job, or in other words, upon all the print data being provided to the printer section 18, the second task changes the print status in the memory 34 from processing-in-progress to waiting in T140.

In T142, the first task performs a process of checking the print status and determines the print status to be waiting. In other words, the first task determines that the job is complete. In T144, the first task performs transmission of a get-jobs request (hereafter, a GJReq) to the server 60. The GJReq is a signal to query whether a new job is occurring.

The printer 10 transmits a GJReq to the server 60 without reestablishing a constant connection with the server 60. The printer 10 with this structure can thus more promptly determine whether a job is occurring than with the structure that transmits a GJReq to the server 60 after reestablishing a constant connection with the server 60.

In response to a GJReq received from the printer 10 in T144, the server 60 transmits a get-jobs response (hereafter, a GJRes) including the job ID BBB to the printer 10 in T146.

In response to a GJRes received from the server 60 in T146, the first task provides a printing process instruction including the job ID BBB in the GJRes to the second task in T148.

The second task then performs processing similar to the processing in T90 to T96 in FIG. 3 using the job ID BBB. The second task provides print data X2 to the printer section 18 and changes the print status in the memory 34 from waiting to processing-in-progress in T150.

In the same manner as in T120, the first task performs a process of checking the print status at intervals of five seconds in, for example, T160. The print status in the memory 34 is changed from printing-in-progress to waiting in response to completion of the job in T162, and then the first task determines the print status to be waiting in T170. The first task then performs transmission of a GJReq to the server 60 in the same manner as in T142.

In response to a GJReq received from the printer 10 in T174, the server 60 transmits a GJRes including no job ID to the printer 10 in T176.

In response to a GJRes including no job ID received from the server 60 in T176, the first task reestablishes a constant connection with the server 60 in T180. The first task then performs transmission of a GN(EWM)Req to the server 60 in T182. The printer 10 then operates in the EWM again. The first task receives a GN(EWM)Res including no job ID from the server 60 at intervals of one minute in, for example, T184.

(Processing Continuous from FIG. 3: FIG. 5 (Case B))

Case B will now be described with reference to FIG. 5. FIG. 5 also shows processing continuous from FIG. 3, similarly to FIG. 4A. In case B in FIG. 5, no new job is generated while the job identifiable with the job ID AAA is being performed. The processing in T190 to T210 is similar to the processing in T100 to T120 in FIG. 4A.

The server 60 does not receive image data X2 from the terminal 50 while the job identifiable with the job ID AAA is being performed. In response to a GJReq received from the printer 10 resulting from the processing in T220 to T224 similar to T140 to T144 in FIG. 4A being performed by the printer 10, the server 60 transmits a GJRes including no job ID to the printer 10 in T226.

In response to a GJRes including no job ID received from the server 60 in T226, the first task reestablishes a constant connection with the server 60 in T230 and performs transmission of a GN(EWM)Req to the server 60 in T232. The printer 10 then operates in the EWM again. The first task receives a GN(EWM)Res including no job ID from the server 60 at intervals of one minute in, for example, T234.

The printer 10 then operates in the EWM again as described above. The printer 10 can thus immediately receive a notification from the server 60 in response to occurrence of a job to be performed by the printer 10, thus allowing the job to be performed promptly.

Figure 6B:
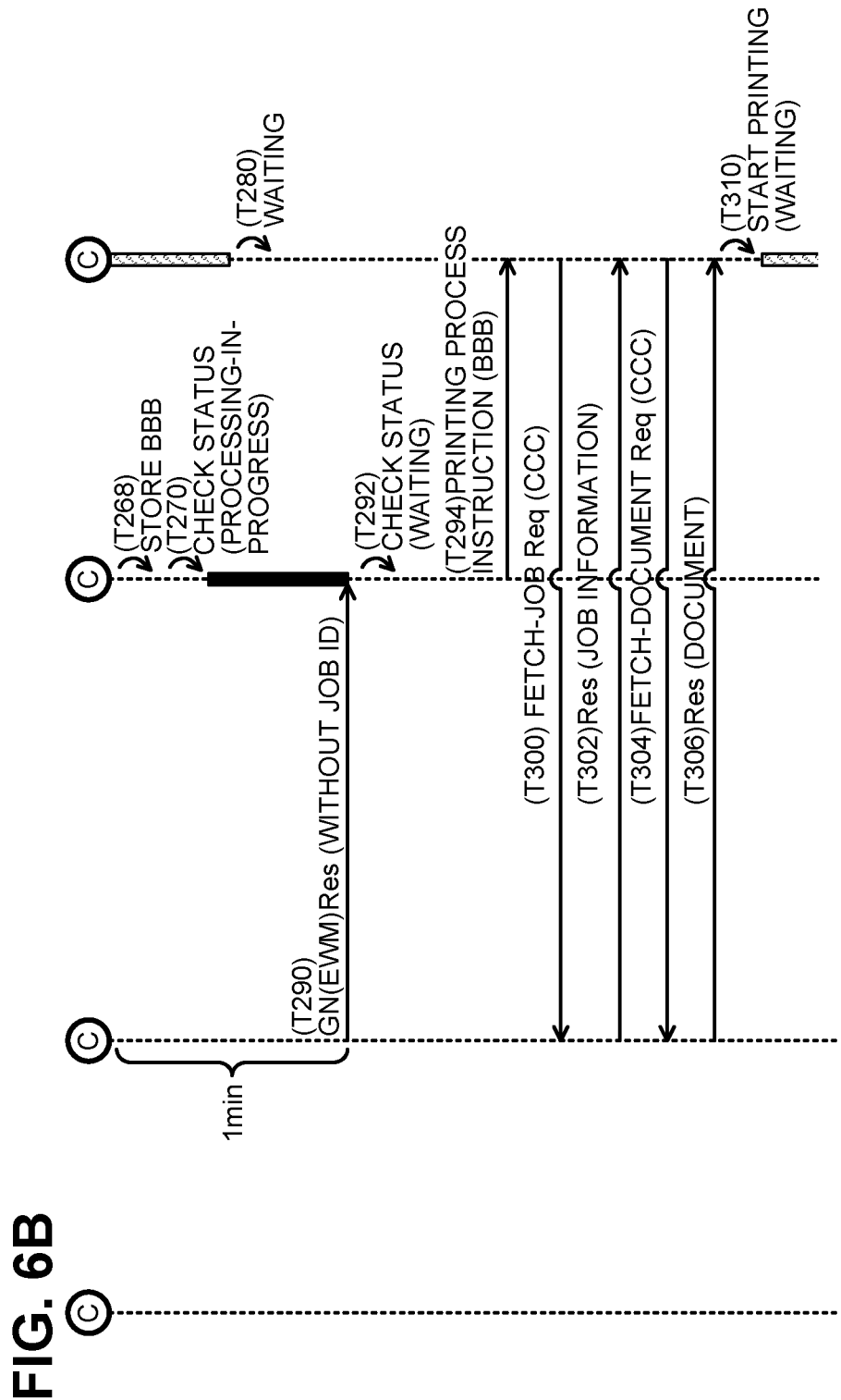
FIG. 6B is a sequence diagram in the comparative example showing processing continuous from FIG. 6A.

Comparative Example: FIGS. 6A and 6B

In the present embodiment described above, the printer 10 disconnects the constant connection with the server 60 and terminates the EWM in response to a GN(EWM)Res including a job ID received from the server 60 (refer to T110 in FIG. 4A and T200 in FIG. 5). A comparative example in which the constant connection is not disconnected will now be described with reference to FIGS. 6A and 6B. A printer 10A in the comparative example includes a first task that continues the EWM without disconnecting the constant connection with the server 60 in response to a GN(EWM)

Res including a job ID received from the server 60. In response to a GN(EMW)Res including no job ID in T250, the first task ends the blocked state. The first task determines the print status to be processing-in-progress in T252 and then returns to the blocked state.

In response to a GN(EMW)Res including no job ID in T254 again, the first task ends the blocked state and determines the print status to be processing-in-progress in T256.

In T260 to T262, the terminal 50 performs processing similar to the processing in T130 to T132 in FIG. 4. In T264 to T266, the server 60 performs processing similar to the processing in T84 to T86 in FIG. 3. However, the job ID used in this example is BBB.

In response to a GN(EMW)Res including the job ID BBB received from the server 60 in T266, the first task ends the blocked state. The first task stores the job ID BBB in the memory 34 in T268. The first task then determines the print status to be processing-in-progress in T270 and returns to the blocked state.

Upon completion of the job, the second task changes the print status in the memory 34 from printing-in-progress to waiting in T280. In this state, the first task is in the blocked state and cannot perform a process of checking the print status until receiving the subsequent GN(EMW)Res from the server 60. In response to a GN(EMW)Res including no job ID received from the server 60 in T290, the first task ends the blocked state and determines the print status to be waiting in T292. The first task then provides a printing process instruction including the stored job ID BBB to the second task in T294. The processing in T300 to T310 is similar to the processing in T90 to T96 in FIG. 3 and T100 in FIG. 4A.

In the comparative example, the first task repeatedly operates in the blocked state for one minute being the interval of reception of a GN(EMW)Res including no job ID from the server 60. In other words, the first task performs a process of checking the print status simply at intervals of one minute. This causes a relatively long time to be taken from when the second task completes the job (refer to T280) to when the first task determines completion of the job (refer to T292). The first task takes a relatively long time to provide a printing process instruction to the second task, thus causing the second task to delay printing with the printer section 18. Unlike this, the printer 10 with the structure in the present embodiment disconnects the constant connection to terminate the EWM and allows the first task to avoid repeatedly operating in the blocked state for one minute. The first task repeatedly performs a process of checking the print status and sleeps for five seconds. The first task can thus determine completion of the job and provide a printing process instruction to the second task more promptly than in the comparative example. The second task thus allows the printer section 18 to perform printing promptly.

(Correspondence)

The printer 10 is an example of a communication apparatus. The server 60 is an example of a server. The EWM is an example of a first mode. The GN(EMW)Res including a Job ID and the GN(EMW)Res including no Job ID are examples of a job notification. The GN(EMW)Res including a job ID in T86 in FIG. 3 is an example of a first job notification and a job occurrence notification. The GN(EMW)Res including no Job ID in T72 to T76 in FIG. 3 is an example of a job non-occurrence notification. The GJReq in T144 in FIG. 4A and the GJReq in T224 in FIG. 5 are examples of a predetermined signal including a query signal. The GJRes including a job ID in T146 in FIG. 4A is an example of associated information and a first response signal. The GJRes including no job ID in T226 in FIG. 5 is an example of a second response signal. One minute is an example of a first predetermined time. Five seconds is an example of a second predetermined time.

Second Embodiment: FIGS. 7A, 7B, 8A and 8B

A second embodiment will now be described. The present embodiment differs from the first embodiment in that the printer 10 operates in the PM instead of the EWM in response to a disconnection of the constant connection. In case A described now with reference to FIGS. 7A and 7B, a new job is generated for the printer 10 operating in the PM with the constant connection being disconnected. Case B in which no new job is generated is then described with reference to FIGS. 8A and 8B.

Figure 7A:
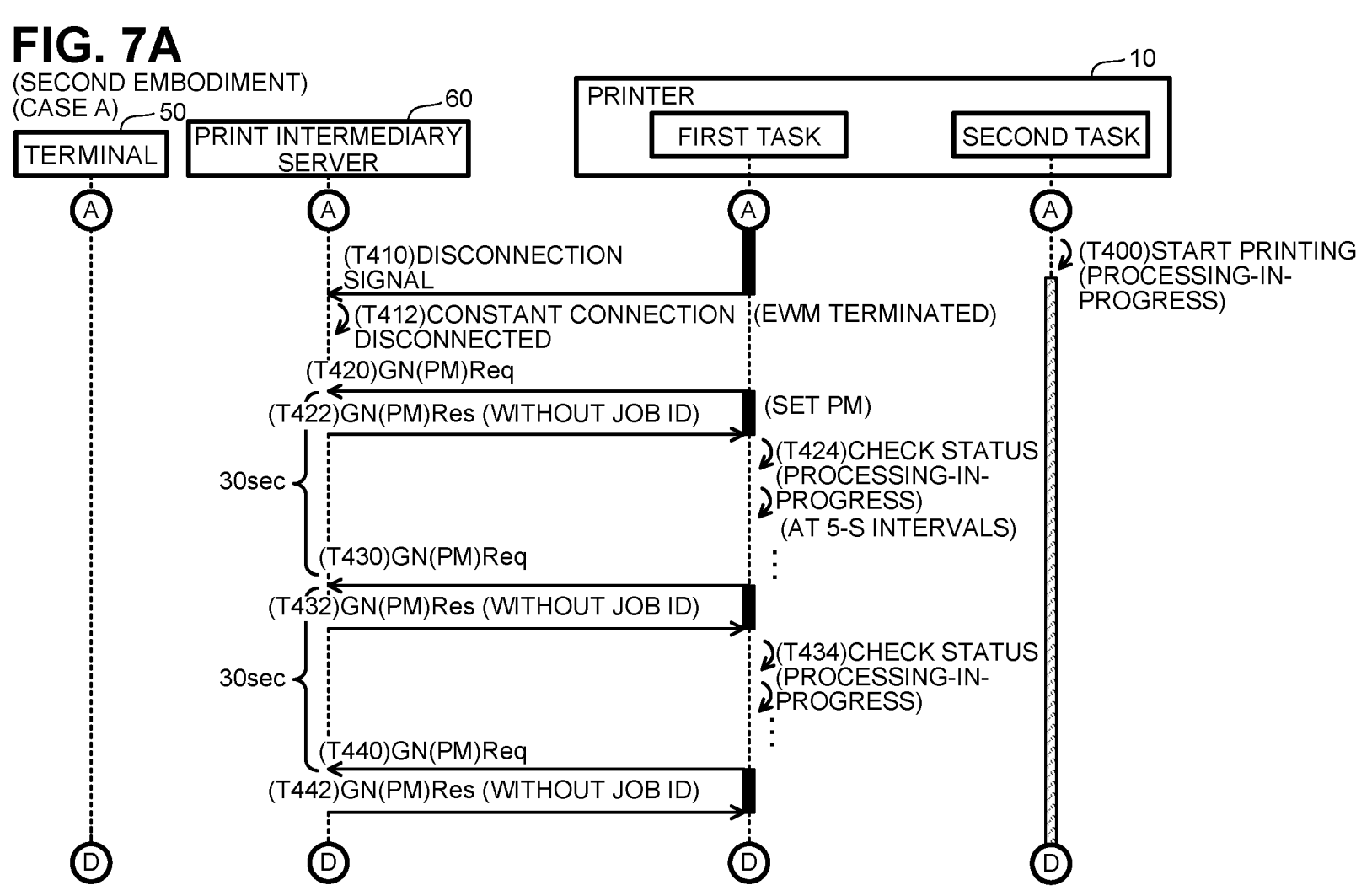

(Case A: FIGS. 7A and 7B)

FIG. 7A shows processing continuous from FIG. 3. The processing in T400 to T412 is similar to the processing in T100 to T112 in FIG. 4A. Similarly to the first embodiment, the printer 10 disconnects the constant connection with the server 60, and thus avoids performing a process of maintaining the constant connection with the server 60 while performing the job corresponding to the job ID AAA (or in other words, between T412 and T470 described later).

The printer 10 terminating the EWM allows the first task to avoid repeatedly operating in the blocked state for substantially one minute. The first task can thus perform another process. More specifically, the first task can perform a process of querying whether a new job to be performed by the printer 10 is occurring in T420. Still more specifically, the printer 10 operating in the PM causes the first task to transmit a GN(PM)Req to the server 60. In response to transmission of a GN(PM)Req, the first task switches to the blocked state.

In response to a GN(PM)Req received from the first task in T420, the server 60 transmits a get-notification (PM) response (hereafter, a GN(PM)Res) including no job ID to the printer 10 in T422.

In the present embodiment, the printer 10 transmits a GN(PM)Req to the server 60 at intervals of 30 seconds (refer to T420, T430, T440, and T456). The server 60 then transmits a GN(PM)Res including no job ID to the printer 10 in a period before the server 60 receives, from the terminal 50, image data representing the image to be printed by the printer 10 (T422, T432, and T442). In response to image data representing the image to be printed by the printer 10 (or in other words, in response to occurrence of a job to be performed by the printer 10) received from the terminal 50, the server 60 transmits a GN(PM)Res including a job ID to the printer 10 (refer to T458).

In response to a GN(PM)Res including no job ID received from the server 60 in T422, the first task ends the blocked state. The first task then performs a process of checking the print status in T424. At the stage of T424, the first task determines that the printing is not complete based on the print status being processing-in-progress. The first task performs a process of checking the print status and then sleeps for five seconds. In other words, the first task repeatedly performs a process of checking the print status and sleeps at intervals of five seconds in the same manner as in T120 in FIG. 4A. For every reception of a GN(PM)Res including no job ID from the server 60 in T432 and T442, the first task ends the blocked state and performs a process of checking the print status in T434 and T444 in the same manner as in T424.

In T450 and T452, the terminal 50 performs processing similar to the processing in T80 and T82 in FIG. 3. In T132, the terminal 50 transmits, to the server 60, the printer ID identifying the printer 10 and image data X3 representing the image to be printed.

In response to the printer ID and the image data X3 received from the terminal 50 in T452, the server 60 generates a job identifiable with the job ID CCC in T454. In response to a GN(PM)Req received from the printer 10 in T456, the server 60 transmits a GN(PM)Res including the job ID CCC to the printer 10 in T458.

In response to the GN(PM)Res including the job ID CCC received from the server 60 in T458, the first task ends the blocked state. The first task stores the job ID CCC in the memory 34 in T460. The first task then determines the print status to be processing-in-progress in T462.

Upon completion of the job, the second task changes the print status in the memory 34 from printing-in-progress to waiting in T470.

The first task performs a process of checking the print status and determines the print status to be waiting in T472. In other words, the first task determines that the job is complete. In T474, the first task provides a printing process instruction including the stored job ID CCC to the second task. The processing in T480 to T490 is similar to the processing in T90 to T96 in FIG. 3 and T100 in FIG. 4A. More specifically, the printer 10 prestores the job ID CCC in the memory 34 and can thus transmit a fetch job request to the server 60 without transmitting a GJReq to the server 60 after completion of the job. The printer 10 with this structure can thus more promptly perform the job than with the structure that transmits a GJReq to the server 60 after completion of the job. Processing similar to the processing in T160 to T184 in FIG. 4B is then performed.

Figure 8A:
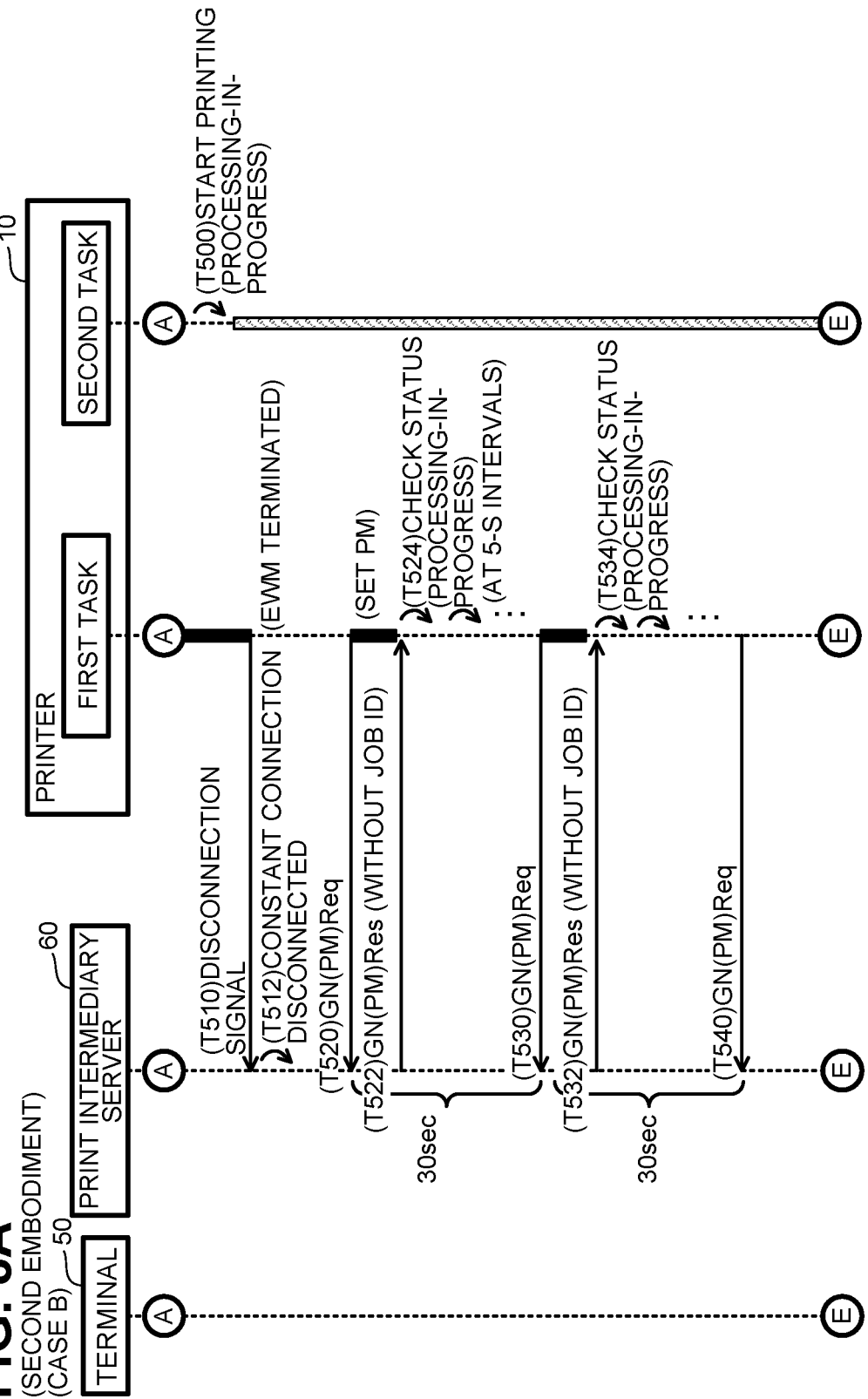
FIG. 8A is a sequence diagram in case B in the second embodiment.
Figure 8B:
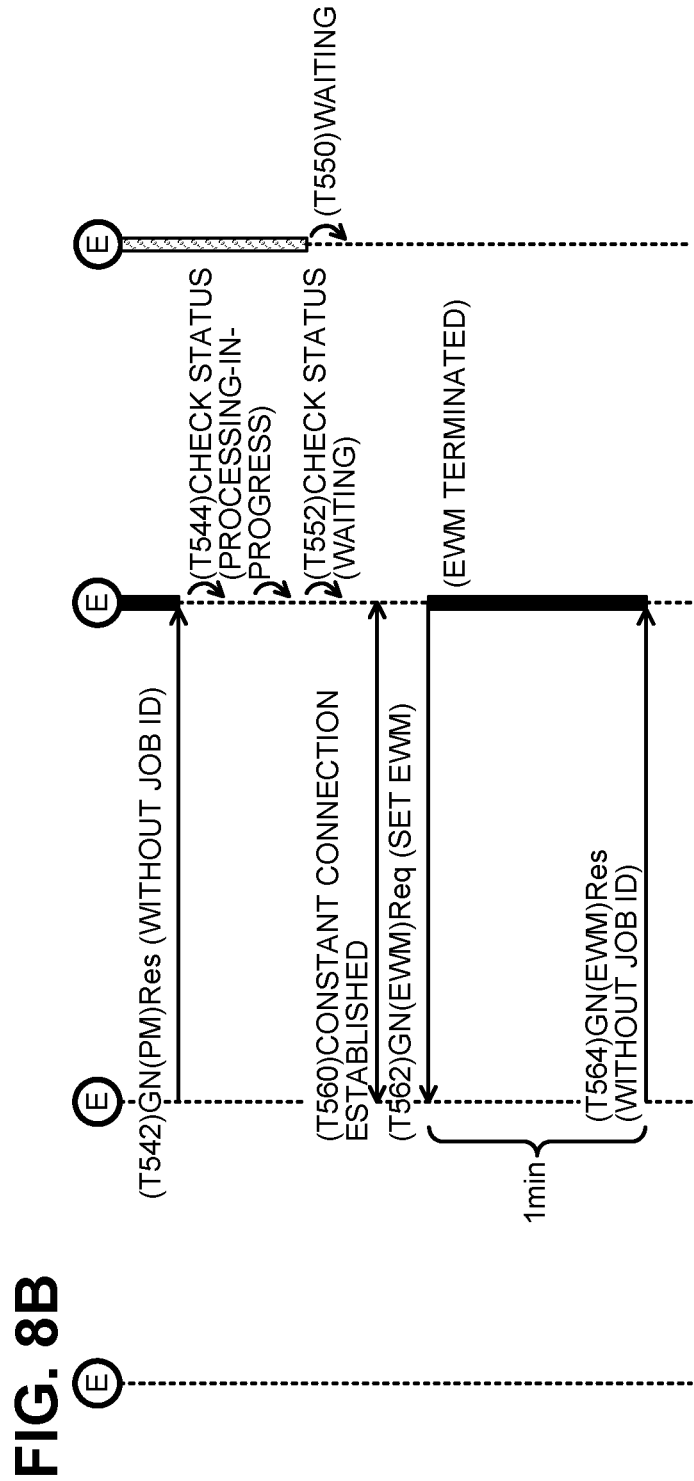
FIG. 8B is a sequence diagram in case B in the second embodiment showing processing continuous from FIG. 8A.

(Case B: FIGS. 8A and 8B)

Case B will now be described with reference to FIGS. 8A and 8B. FIG. 8A also shows processing continuous from FIG. 3, similarly to FIG. 7A. In case B in FIGS. 8A and 8B, no new job is generated while the job identifiable with the job ID AAA is being performed. The processing in T500 to T544 is similar to the processing in T400 to T444 in FIGS. 7A and 7B.

In response to the processing in T550 to T552 similar to T470 to T472 in FIG. 7B being performed by the printer 10, the first task reestablishes a constant connection with the server 60 in T560. The first task then performs transmission of a GN(EMW)Req to the server 60 in T562. The printer 10 then operates in the EWM again. The first task receives a GN(EMW)Res including no job ID from the server 60 at intervals of one minute in, for example, T564.

The printer 10 then operates in the EWM again as described above. The printer 10 can thus immediately receive a notification from the server 60 in response to occurrence of a job to be performed by the printer 10, thus allowing the job to be performed promptly.

(Correspondence)

The PM is an example of a second mode. A signal in T480 (fetch job Req) in FIG. 7B is an example of a predetermined signal. A signal Res in T482 in FIG. 7B is an example of associated information. The GN(PM)Res including a job ID in T458 in FIG. 7B is an example of a second job notification. The job information corresponds to setting information.

Although specific examples of the present invention are described herein in detail, these are mere examples and do not limit the scope of the claims. The techniques described in the scope of the claims include various modifications and changes of the specific examples described above. Modifications of the above embodiments will be described below.

First Modification

The printer 10 may be a multifunctional printer that can perform communication with a telephone line. In response to image data transmitted from the terminal 50 to the server 60, the multifunctional printer may receive the image data from the server 60 and transmit the image data to another multifunctional printer using a telephone line. In this case, the job is a process of transmitting image data using a telephone line. In other words, the job is not limited to printing but may be the transmission of image data using a telephone line as in the present modification or may be another process.

Second Modification

The first task may monitor completion of the job by querying the second task as to whether the job is complete, instead of checking the print status in the memory 34.

Third Modification

The first task may not include monitoring whether the job is complete. In this case, the first task can perform a process other than monitoring.

Fourth Modification

In response to a determination that the job is complete in T142 in FIG. 4A, the first task may reestablish a constant connection and then perform transmission of a get-jobs Req to the server 60 in T144. In other words, the predetermined signal transmitter may transmit the predetermined signal to the server after the connection is reestablished.

Fifth Modification

T230 in FIG. 5 may be eliminated. More specifically, in response to a GJRes including no job ID received from the server 60 in T226, the first task may transmit a GN(PM)Req, instead of a GN(EMW)Req, to the server 60 in T232 without reestablishing a constant connection. In other words, the printer 10 may operate in the PM instead of the EWM.

Sixth Modification

T560 in FIG. 8B may be eliminated. More specifically, in response to a determination that no job to be performed by the printer 10 is occurring, the first task may transmit a GN(PM)Req, instead of a GN(EMW)Req, to the server 60 in T562 without reestablishing a constant connection. In other words, the printer 10 may maintain the operation in the PM.

Seventh Modification

The printer 10 may check the print status at intervals of a predetermined time longer than or equal to one minute, instead of five seconds. In other words, the second predetermined time may not be shorter than the first predetermined time. In another modification, the printer 10 may check the print status at intervals of a predetermined time shorter than one minute and other than five seconds.

Eighth Modification

T110 and T112 in FIG. 4A, T200 and T202 in FIGS. 5, T410 and T412 in FIG. 7A, and T510 and T512 in FIG. 8A may be eliminated. In other words, the printer 10 may not disconnect the constant connection.

Ninth Modification

T460 in FIG. 7B may be eliminated. In this case, the first task performs transmission of a GJReq (refer to T144 in FIG. 4A) to the server 60 in response to the processing in T462 to T472 being performed. The GJReq is a signal to query whether a new job is occurring. This causes the server 60 to transmit a GJRes including the job ID CCC to the printer 10. In response to the GJRes received from the server 60, the first task provides a printing process instruction including the job ID CCC in the GJRes to the second task in T474. The processing in T480 to T490 and the processing in T160 to T184 in FIG. 4B for FIG. 7B are then performed.

Tenth Modification

The communication apparatus may be another device such as a scanner, a multifunctional printer, a portable terminal, a personal computer (PC), or a server, instead of being the printer 10.

Eleventh Modification

In each of the above embodiments, the processes in FIGS. 2 to 8B are performed using software. In another modification, at least one of the processes shown in FIGS. 2 to 8B may be performed using hardware, such as a logic circuit.

The technical elements described herein or in the drawings each produce the technical effects separately or in combination, and combinations of the elements are not limited to those described in the claims as filed. The techniques illustrated herein or in the drawings may achieve multiple purposes at a time. Achieving one of the purposes may produce technical effects.

What is claimed is:

1. A communication apparatus comprising:
   a controller configured to:
      set an operation mode of the communication apparatus to a first mode, the first mode being a mode to receive a job notification from a server using a connection established for server-push communication between the communication apparatus and the server, the job notification indicating whether a job to be performed by the communication apparatus is occurring;
      disconnect the connection before completion of a first job in response to a first job notification being received from the server using the connection during the operation mode of the communication apparatus being the first mode, the first job notification indicating occurrence of the first job to be performed by the communication apparatus; and
      perform the first job in response to the first job notification being received from the server.

2. The communication apparatus according to claim 1, wherein the controller is further configured to:
   monitor completion of the first job;
   transmit a predetermined signal to the server in response to completion of the first job; and
   perform a second job in a case where associated information is received from the server in response to the predetermined signal being transmitted to the server, the associated information being associated with the second job to be performed by the communication apparatus.

3. The communication apparatus according to claim 2, wherein the controller transmits, in response to completion of the first job, the predetermined signal to the server without the connection being reestablished.

4. The communication apparatus according to claim 2, wherein the predetermined signal includes a query signal to query whether a new job is occurring, and
   wherein the associated information includes a first response signal indicating occurrence of the second job.

5. The communication apparatus according to claim 4, wherein the controller is further configured to:
   set the operation mode of the communication apparatus to the first mode by reestablishing the connection in a case where a second response signal is received from the server in response to the predetermined signal including the query signal being transmitted to the server, the second response signal indicating non-occurrence of a new job.

6. The communication apparatus according to claim 2, wherein the communication apparatus further comprises a memory,
   wherein the controller is further configured to:
      set the operation mode of the communication apparatus to a second mode in response to the first job notification being received from the server using the connection during the operation mode of the communication apparatus being the first mode, the second mode being a mode to repeatedly transmit a polling signal to the server and receive the job notification from the server without using the connection; and
      cause the memory to store job identification information in a case where a second job notification is received from the server in response to the polling signal being transmitted to the server before completion of the first job, the second job notification indicating occurrence of the second job to be performed by the communication apparatus, the job identification information identifying the second job,
   wherein the controller transmits, in response to completion of the first job, the predetermined signal including the job identification information stored in the memory to the server without transmitting a query signal to query whether a new job is occurring, and
   wherein the associated information includes setting information for performing the second job.

7. The communication apparatus according to claim 6, wherein the controller is further configured to:
   set the operation mode of the communication apparatus to the first mode instead of the second mode in a case where the job notification indicating occurrence of a job to be performed by the communication apparatus is not received from the server in response to the polling signal transmitted to the server before completion of the first job.

8. A communication apparatus comprising:
   a controller configured to:
      set an operation mode of the communication apparatus to a first mode, the first mode being a mode to receive a job notification from a server using a connection established for server-push communication between the communication apparatus and the server, the job notification indicating whether a job to be performed by the communication apparatus is occurring, the first mode being a mode in which the communication apparatus operates to perform a first task to receive, in response to occurrence of a job to be performed by the communication apparatus, a job occurrence notification as the job notification, and receive, in response to non-occurrence of a job to be performed by the communication apparatus, a job non-occurrence notification as the job notification at intervals of a first predetermined time, the job occurrence notification indicating that a job to be performed by the communication apparatus is occurring, the job non-occurrence notification indicating that a job to be performed by the communication apparatus is not occurring, the operation mode being switched to a blocked state in which another process is not performed in a period from when a process of receiving the job non-occurrence notification is performed to when a process of receiving a subsequent job non-occurrence notification is performed;

terminate the first mode in response to a first job occurrence notification received, using the first task, from the server using the connection during the operation mode of the communication apparatus being the first mode, the first job occurrence notification indicating occurrence of a first job to be performed by the communication apparatus; and perform the first job using a second task different from the first task in response to the first job occurrence notification being received from the server.

9. The communication apparatus according to claim 8, wherein the controller is further configured to:

monitor, using the first task, completion of the first job in response to the first mode being terminated;

transmit a predetermined signal to the server in response to completion of the first job; and perform a second job using the second task in a case where associated information is received from the server in response to the predetermined signal being transmitted to the server, the associated information being associated with the second job to be performed by the communication apparatus.

10. The communication apparatus according to claim 9, wherein the controller monitors completion of the first job by checking for completion of the first job at intervals of a second predetermined time, and wherein the second predetermined time is shorter than the first predetermined time.

11. The communication apparatus according to claim 9, wherein the predetermined signal includes a query signal to query whether a new job is occurring, and wherein the associated information includes a first response signal indicating occurrence of the second job.

12. The communication apparatus according to claim 11, wherein the controller is further configured to:

set the operation mode of the communication apparatus to the first mode in a case where a second response signal is received from the server in response to the predetermined signal including the query signal being transmitted to the server, the second response signal indicating non-occurrence of a new job.

13. The communication apparatus according to claim 9, wherein the communication apparatus further comprises a memory, wherein the controller is further configured to:

set the operation mode of the communication apparatus to a second mode after the first mode is terminated, the second mode being a mode to repeatedly transmit a polling signal, using the first task, to the server and receive the job notification from the server without using the connection; and cause the memory to store job identification information in a case where a second job occurrence notification is received, using the first task, from the server in response to the polling signal being transmitted to the server before completion of the first job, the second job occurrence notification indicating occurrence of the second job to be performed by the communication apparatus, the job identification information identifying the second job, wherein the controller transmits, in response to completion of the first job, the predetermined signal including the job identification information stored in the memory to the server without transmitting a query signal to query whether a new job is occurring, and wherein the associated information includes setting information for performing the second job.

14. The communication apparatus according to claim 13, wherein the controller is further configured to:

set the operation mode of the communication apparatus to the first mode in a case where the job occurrence notification is not received from the server in response to the polling signal being transmitted to the server before completion of the first job.

15. The communication apparatus according to claim 8, wherein the controller is further configured to:

disconnect the connection before completion of the first job in response to the first job occurrence notification being received from the server using the connection during the operation mode of the communication apparatus being the first mode.

16. A non-transitory computer readable recording medium for storing a computer program for a communication apparatus, the computer program, when executed by a computer in the communication apparatus, causes the communication apparatus to:

set an operation mode of the communication apparatus to a first mode, the first mode being a mode to receive a job notification from a server using a connection established for server-push communication between the communication apparatus and the server, the job notification indicating whether a job to be performed by the communication apparatus is occurring;

disconnect the connection before completion of a first job in response to a first job notification being received from the server using the connection during the operation mode of the communication apparatus being the first mode, the first job notification indicating occurrence of the first job to be performed by the communication apparatus; and perform the first job in response to the first job notification being received from the server.

17. A non-transitory computer readable recording medium for storing a computer program for a communication apparatus, the computer program, when executed by a computer in the communication apparatus, causes the communication apparatus to:

set an operation mode of the communication apparatus to a first mode, the first mode being a mode to receive a job notification from a server using a connection established for server-push communication between the communication apparatus and the server, the job notification indicating whether a job to be performed by the communication apparatus is occurring, the first mode being a mode in which the communication apparatus operates to perform a first task to receive, in response to occurrence of a job to be performed by the communication apparatus, a job occurrence notification as the job notification, and receive, in response to non-occurrence of a job to be performed by the communication apparatus, a job non-occurrence notification as the job notification at intervals of a first predetermined time, the job occurrence notification indicating that a job to be performed by the communication apparatus is occurring, the job non-occurrence notification indicating that a job to be performed by the communication apparatus is not occurring, the operation mode being switched to a blocked state in which another process is not performed in a period from when a process of receiving the job non-occurrence notification is performed to when a process of receiving a subsequent job non-occurrence notification is performed;

terminate the first mode in response to a first job occurrence notification received, using the first task, from the server using the connection during the operation mode of the communication apparatus being the first mode, the first job occurrence notification indicating occurrence of a first job to be performed by the communication apparatus; and perform the first job using a second task different from the first task in response to the first job occurrence notification being received from the server.

* * * * *